(12) United States Patent
Millard

(10) Patent No.: US 7,975,303 B1
(45) Date of Patent: Jul. 5, 2011

(54) EFFICIENT FILE SCANNING USING INPUT-OUTPUT HINTS

(75) Inventor: John Millard, Pasadena, CA (US)

(73) Assignee: Symantec Corporation, Mountain View, CA (US)

( * ) Notice: Subject to any disclaimer, the term of this patent is extended or adjusted under 35 U.S.C. 154(b) by 1138 days.

(21) Appl. No.: 11/167,501

(22) Filed: Jun. 27, 2005

(51) Int. Cl.
*G06F 11/00* (2006.01)
*G06F 7/04* (2006.01)
*G06F 13/00* (2006.01)
*H04L 29/06* (2006.01)
*H02H 3/05* (2006.01)
*G06F 11/30* (2006.01)
*G06F 21/00* (2006.01)

(52) U.S. Cl. ............... 726/24; 726/22; 726/26; 711/110
(58) Field of Classification Search .................... 726/24, 726/22, 26; 711/170
See application file for complete search history.

(56) References Cited

U.S. PATENT DOCUMENTS

| | | | |
|---|---|---|---|
| 5,398,196 A | 3/1995 | Chambers | |
| 5,452,442 A | 9/1995 | Kephart | |
| 5,495,607 A | 2/1996 | Pisello et al. | |
| 5,572,590 A | 11/1996 | Chess | |
| 5,675,710 A | 10/1997 | Lewis | |
| 5,694,569 A | 12/1997 | Fischer | |
| 5,826,249 A | 10/1998 | Skeirik | |
| 5,832,208 A | 11/1998 | Chen et al. | |
| 5,832,527 A | 11/1998 | Kawaguchi | |
| 5,854,916 A | 12/1998 | Nachenberg | |
| 5,884,033 A | 3/1999 | Duvall et al. | |
| 5,944,821 A | 8/1999 | Angelo | |
| 5,974,549 A | 10/1999 | Golan | |
| 5,983,348 A | 11/1999 | Ji | |
| 6,006,242 A | 12/1999 | Poole et al. | |
| 6,021,510 A | 2/2000 | Nachenberg | |
| 6,023,723 A | 2/2000 | McCormick et al. | |
| 6,052,709 A | 4/2000 | Paul | |
| 6,072,942 A | 6/2000 | Stockwell et al. | |
| 6,092,194 A | 7/2000 | Touboul | |
| 6,094,731 A | 7/2000 | Waldin et al. | |
| 6,125,459 A | 9/2000 | Andoh et al. | |
| 6,161,130 A | 12/2000 | Horvitz et al. | |
| 6,167,434 A | 12/2000 | Pang | |
| 6,253,169 B1 | 6/2001 | Apte et al. | |

(Continued)

FOREIGN PATENT DOCUMENTS

EP 0636977 A2 2/1995

(Continued)

OTHER PUBLICATIONS

Sirish A. Kondi, Yoginder S. Dandass; "Scanning workstation memory for malicious codes using dedicated coprocessors", Mar. 2006, ACM-SE 44: Proceedings of the 44th annual Southeast regional conference, Publisher: ACM, pp. 661-666.*

(Continued)

*Primary Examiner* — Matthew B Smithers
*Assistant Examiner* — Courtney D Fields
(74) *Attorney, Agent, or Firm* — Fenwick & West LLP

(57) ABSTRACT

A scanning optimization manager scans files for malicious code. The scanning optimization manager creates listings of the portions of scanned files accessed during the scanning. The scanning optimization manager proceeds to utilize these listings of accessed portions of files as I/O hints to optimize subsequent scans of the files for malicious code.

21 Claims, 4 Drawing Sheets

U.S. PATENT DOCUMENTS

| | | | |
|---|---|---|---|
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,721,721 B1 | 4/2004 | Bates et al. | |
| 6,751,789 B1 | 6/2004 | Berry et al. | |
| 6,772,346 B1 | 8/2004 | Chess et al. | |
| 6,842,861 B1 | 1/2005 | Cox et al. | |
| 6,886,099 B1 | 4/2005 | Smithson et al. | |
| 6,944,555 B2 | 9/2005 | Blackett et al. | |
| 6,952,779 B1 | 10/2005 | Cohen et al. | |
| 6,973,578 B1 | 12/2005 | McIchionc | |
| 7,024,403 B2 | 4/2006 | Kyler | |
| 7,043,757 B2 * | 5/2006 | Hoefelmeyer et al. | 726/24 |
| 7,130,981 B1 * | 10/2006 | Nachenberg | 711/170 |
| 7,640,586 B1 * | 12/2009 | Johnson et al. | 726/24 |
| 2002/0035693 A1 | 3/2002 | Eyres et al. | |
| 2002/0038308 A1 | 3/2002 | Cappi | |
| 2002/0046207 A1 | 4/2002 | Chino et al. | |
| 2002/0073046 A1 | 6/2002 | David | |
| 2002/0087649 A1 | 7/2002 | Horvitz | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023875 A1 | 1/2003 | Hursey et al. | |
| 2003/0033587 A1 | 2/2003 | Ferguson et al. | |
| 2003/0061287 A1 | 3/2003 | Yu et al. | |
| 2003/0065926 A1 | 4/2003 | Schultz et al. | |
| 2003/0110280 A1 | 6/2003 | Hinchliffe et al. | |
| 2003/0110393 A1 | 6/2003 | Brock et al. | |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0154394 A1 | 8/2003 | Levin | |
| 2003/0167402 A1 | 9/2003 | Stolfo et al. | |
| 2003/0233352 A1 | 12/2003 | Baker | |
| 2004/0015554 A1 | 1/2004 | Wilson | |
| 2004/0039921 A1 | 2/2004 | Chuang | |
| 2004/0103310 A1 | 5/2004 | Sobel et al. | |
| 2004/0117401 A1 | 6/2004 | Miyata et al. | |
| 2004/0117641 A1 | 6/2004 | Kennedy et al. | |
| 2004/0220975 A1 | 11/2004 | Carpentier et al. | |
| 2006/0288416 A1 * | 12/2006 | Costea et al. | 726/24 |

FOREIGN PATENT DOCUMENTS

| | | | |
|---|---|---|---|
| EP | 1408393 A2 | | 4/2004 |
| GB | 2470928 A | * | 12/2010 |
| WO | WO 99/15966 A1 | | 4/1999 |
| WO | WO 00/28420 A2 | | 5/2000 |
| WO | WO 02/33525 A2 | | 4/2002 |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Burchell, Jonathan, "NetShield 1.5", Virus Bulletin, Aug. 1994, pp. 21-23, XP 000617453.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computers & Security, vol. 15, No. 7, pp. 595-626, 1996, Reykjavik, Iceland.

* cited by examiner

EFFICIENT FILE SCANNING USING INPUT-OUTPUT HINTS

TECHNICAL FIELD

This invention pertains generally to computer security, and more specifically to using input-output hints to efficiently scan files for malicious code.

BACKGROUND

The time required to scan files for malicious code is a significant performance issue for anti-malicious code software. Therefore, decreasing the amount of time required for such scanning would be highly desirable. When scanning a file for a specific malicious code signature, only a small percentage of the file actually needs to be examined to determine whether the file is infected with the malicious code. However, it is very difficult to predict in advance which portions of the file will need to be examined. Thus, a lot of time is spent reading the relevant portions of the file from media (e.g., a local or network hard disk) into dynamic memory as the file is being scanned. Because media input-output (I/O) is relatively slow, this process decreases the performance of anti-malicious code scanning significantly.

What is needed are computer implemented methods, computer readable media and computer systems for reducing the amount of time spent on I/O during anti-malicious code scanning.

DISCLOSURE OF INVENTION

Computer-implemented methods, computer systems and computer-readable media efficiently scan files. More specifically, a scanning optimization manager scans files for malicious code. The scanning optimization manager creates listings of the portions of scanned files accessed during the scanning. The scanning optimization manager proceeds to utilize these listings of accessed portions of files as I/O hints to optimize subsequent scans of the files for malicious code. In one embodiment of the present invention, the scanning optimization manager uses I/O hints to read only relevant portions of previously scanned files into dynamic memory from media prior subsequent scans of those files. In such an embodiment, the scanning optimization manager only scans the relevant portions of these files in dynamic memory.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
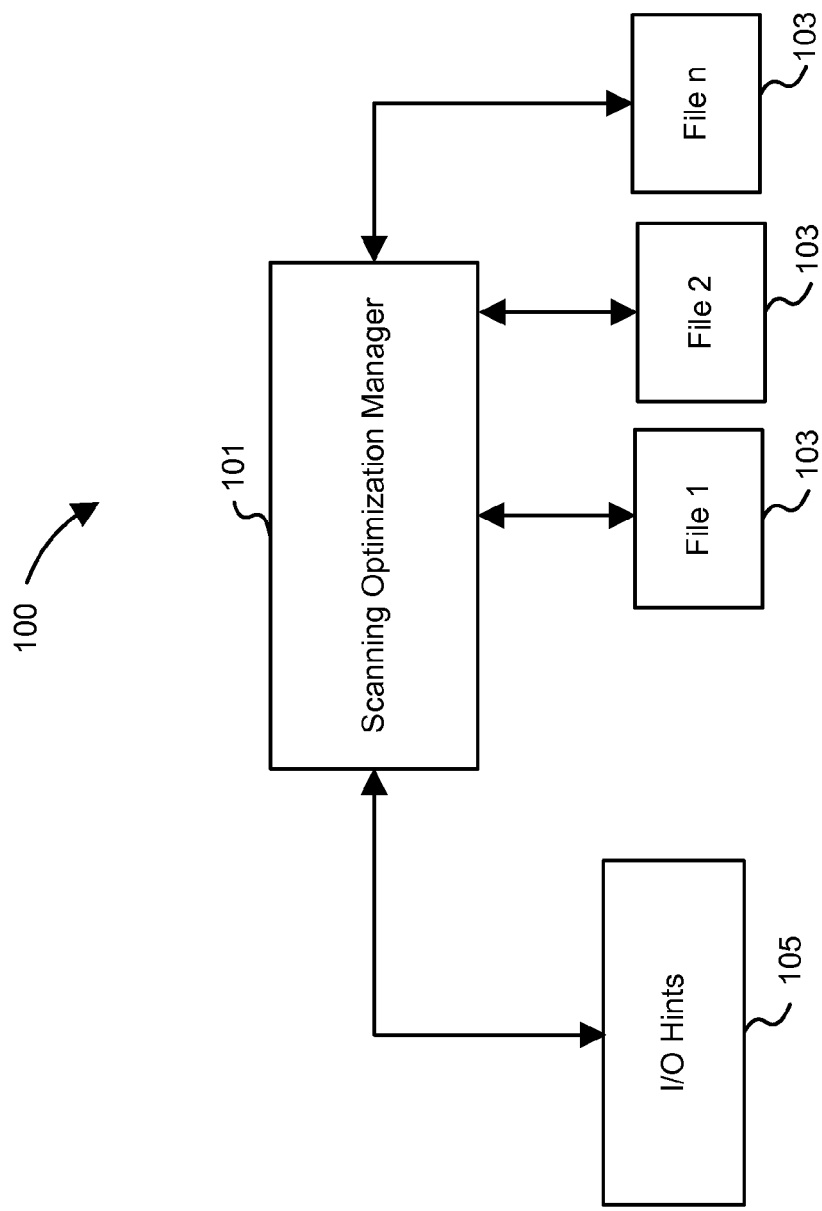
FIG. 1 is a block diagram illustrating a high level overview of a system for practicing some embodiments of the present invention.

FIG. 1 illustrates a high level overview of a system 100 for practicing some embodiments of the present invention. A scanning optimization manager 101 optimizes the scanning of files 103 for malicious code by using previously compiled input-output hints 105. It is to be understood that although the scanning optimization manager 101 is illustrated as a single entity, as the term is used herein a scanning optimization manager 101 refers to a collection of functionalities which can be implemented as software, hardware, firmware or any combination of these. Where a scanning optimization manager 101 is implemented as software, it can be implemented as a standalone program, but can also be implemented in other ways, for example as part of a larger program, as a plurality of separate programs, as one or more device drivers or as one or more statically or dynamically linked libraries.

As illustrated in FIG. 1, the scanning optimization manager 101 scans files 103 for malicious code. Typically, this involves looking for a signature that identifies a specific piece of malicious code (e.g., a known virus or worm). As explained above, this generally requires only examining a small percentage of the file 103, but which portions need to be examined are difficult to predict ahead of time. Therefore, the first time that a scanning optimization manager 101 scans a specific file 103 looking for a malicious code signature, the scanning optimization manager 101 creates a listing 105 of the portions of the file 103 accessed during the scanning. This listing 105 can then be used by the scanning optimization manager 101 as a set of input-output hints 105 to optimize subsequent scans of that file 103 for malicious code. Knowing in advance which portions of a file 103 need to be examined allows the scanning optimization manager 101 to optimize the scan of the file 103 in various ways, as explained in detail below.

The specific format of the input-output hints 105 is a variable design parameter. For example, file system specific or generalized data indicating which portions of each file 103 were examined can be stored in a single file, individual entries for each scanned file 103 can be stored in a database or table, etc. Various options will be readily apparent to those of ordinary skill in the relevant art in light of this specification.

Once input-output hints 105 for a file 103 have been created, the scanning optimization manager 101 can use the hints 105 to optimize subsequent scans of that file 103. In some embodiments, the scanning optimization manager 101 reads the relevant portions of the file 103 into dynamic memory from media prior to each subsequent scan of that file 103. The scanning optimization manager 101 is thus able to scan only the relevant portions of the file 103 in dynamic memory, thereby eliminating the lengthy time overhead required to read the file portions to be examined from disk during a scan.

Figure 2:
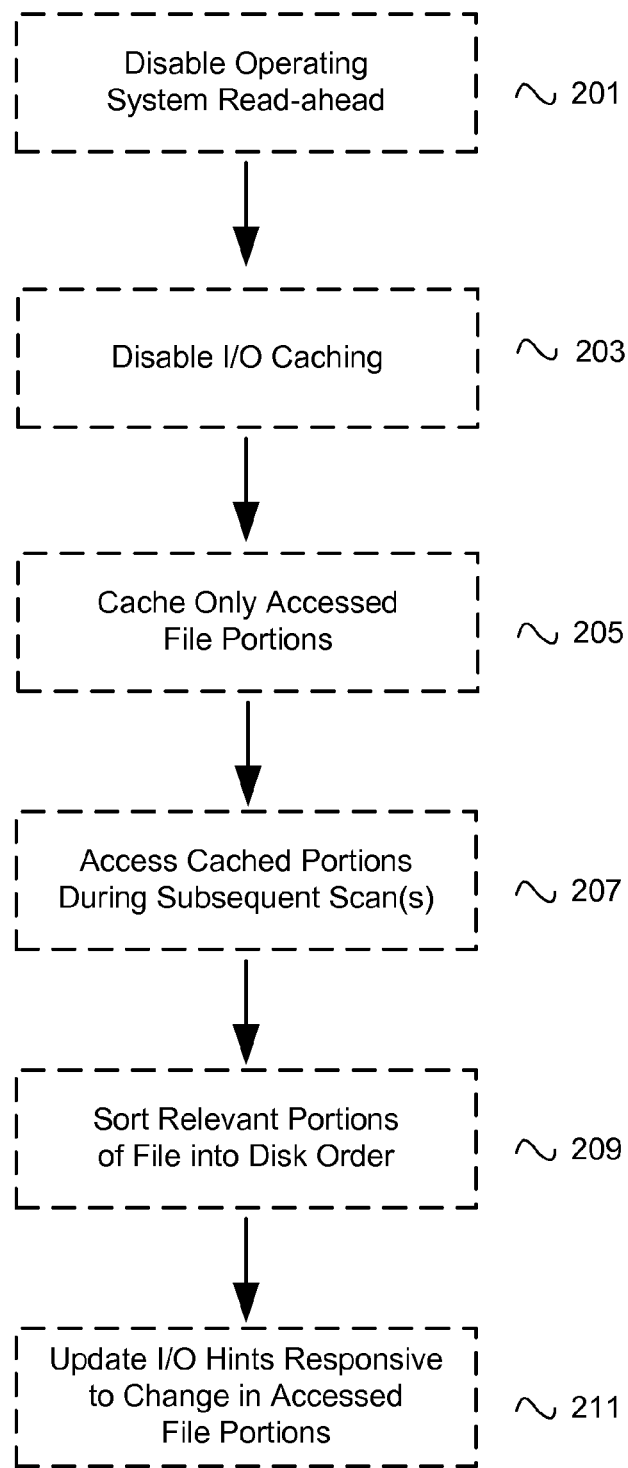
FIG. 2 is a flowchart, illustrating steps for optimizing file scanning, according to some embodiments of the present invention.

As illustrated in FIG. 2, knowing in advance which portions of a file 103 need to be examined during a scan enables various additional scanning optimizations. For example, in some embodiments of the present invention, the scanning optimization manager 101 utilizes the input-output hints 105 to perform some or all of the following scanning optimizations as desired.

The scanning optimization manager 101 can disable 201 operating system read-ahead during the subsequent scan of the file 103. Because the scanning optimization manager 101 knows in advance which portions of the file 103 it will be reading, operating system read-ahead will not provide any benefit. Thus, the time and operating system resources required by read-ahead can be saved by disabling 201 this feature.

Additionally, the scanning optimization manager 101 can disable 203 input-output caching during subsequent scans of a file 103 for which input-output hints 105 are available. Because of the existence of the input-output hints 105, the scanning optimization manager 101 will not benefit from a cached copy of the file 103, and thus the overhead associated with caching can be saved as well.

Although scanning can be optimized by disabling 203 input-output caching during scanning generally, in some embodiments of the present invention, the scanning optimization manager 101 caches 205 only the accessed portions of a file 103 during an initial scan. Then, the scanning optimization manager 101 accesses 207 the cached portions of that file 103 during subsequent scans. This further optimizes the subsequent scans.

Furthermore, the scanning optimization manager 101 can use the input-output hints 105 to better sort 209 the relevant portions of the file 103 into disk order. More robustly sorting 209 the relevant portions of the file 103 into disk order further improves scanning efficiency.

Typically, the portions of a file 103 that need to be accessed when scanning for malicious code signatures do not change, even when the target signature changes. However, when the portions of a file 103 which are accessed during anti-malicious code scanning do change, the scanning optimization manager 101 updates 211 the associated input-output hints 105 responsive to the change.

Figure 3:
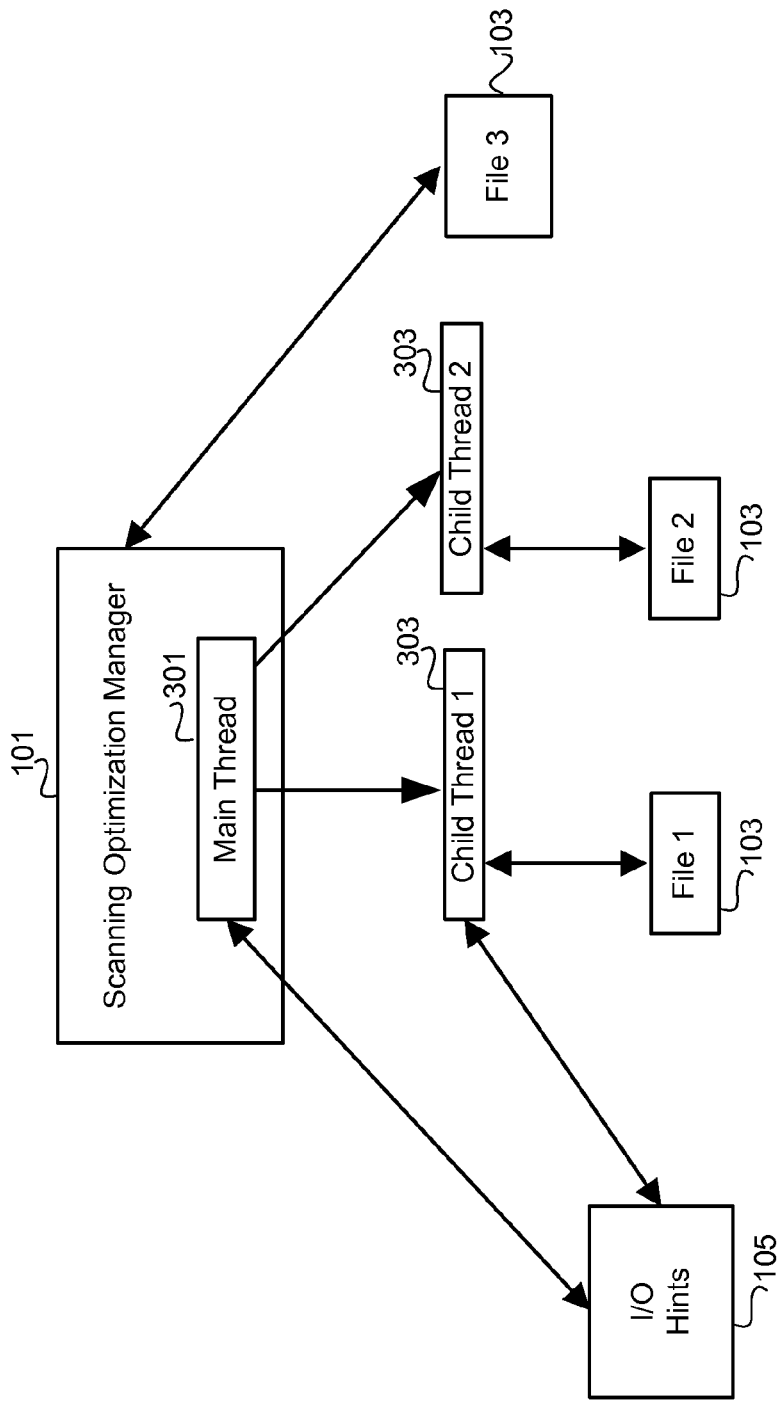
FIG. 3 is a block diagram, illustrating using input-output hints to optimize the use of multithreading during file scanning, according to some embodiments of the present invention.

As illustrated in FIG. 3, the input-output hints 105 also enable the scanning optimization manager 101 to execute efficient multi-threaded anti-malicious code scanning. In some embodiments of the present invention, the main thread 301 of the scanning optimization manager 101 launches a separate thread 303 (e.g., a child thread) to perform an optimized scan of a file 103 utilizing associated input-output hints 105, as described above. While the separate thread 303 performs the compute-bound scan, the main thread 301 continues to process additional files 103 for malicious code scanning, for example by performing the input-output processing for the next file 103 to be scanned. Additional separate threads 303 can be launched to scan additional files 103 as desired.

Figure 4:
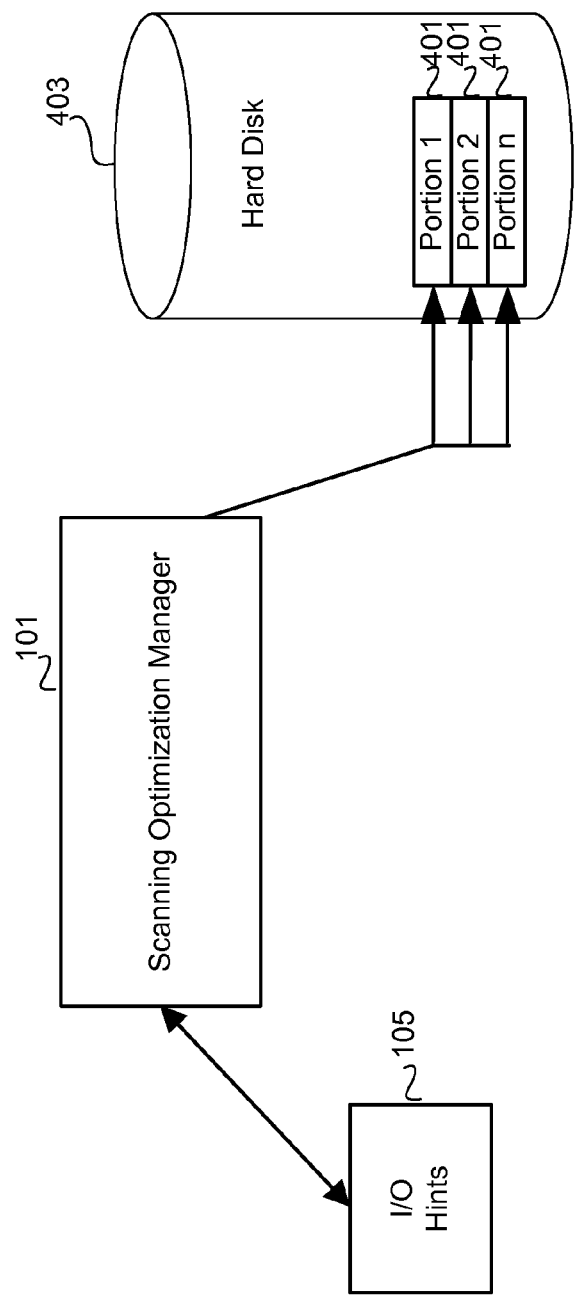
FIG. 4 is a block diagram, illustrating using input-output hints to optimize the storage of files, according to some embodiments of the present invention.

Turning to FIG. 4, in some embodiments of the present invention the scanning optimization manager 101 also utilizes a listing 105 of accessed portions 401 of a file 103 to optimize the storing of that file 103 on a medium 403 (e.g., a disk). More specifically, the scanning optimization manager 101 can use the input-output hints 105 to fragment the file so as to store the accessed portions 401 of the file 103 contiguously on the disk 403, and next to the portions of other files to be scanned. The portions of the files that are not accessed during scanning are stored elsewhere on the disk. This makes future access of these portions 401 faster.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for efficiently scanning files for malicious code, the method comprising:
    using a computer to perform steps comprising:
        scanning a file stored on a medium for malicious code identified by a malicious code signature;
        creating a listing of portions of the file accessed during the scanning for the malicious code signature; and
        utilizing the listing of accessed portions of the file to optimize a subsequent scan of the file by the computer for malicious code, wherein the utilizing comprises, prior to the subsequent scan of the file, relocating the accessed portions of the file to be contiguous on the medium.

2. The method of claim 1 wherein utilizing the listing of accessed portions of the file to optimize the subsequent scan of the file further comprises:
    reading only relevant portions of the file into dynamic memory from the medium prior to the subsequent scan of the file, the relevant portions determined responsive to the listing of portions of the file accessed during the scan; and
    scanning only the relevant portions of the file in dynamic memory.

3. The method of claim 1 wherein utilizing the listing of accessed portions of the file to optimize the subsequent scan of the file further comprises:
    disabling operating system read-ahead during the subsequent scan of the file.

4. The method of claim 1 wherein utilizing the listing of accessed portions of the file to optimize the subsequent scan of the file further comprises:
    disabling operating system input-output caching during the subsequent scan of the file.

5. The method of claim 1 further comprising:
    a main thread launching at least one separate thread;
    a separate thread performing an optimized scan of the file utilizing the listing of accessed portions; and
    the main thread continuing to process other files for malicious code scanning.

6. The method of claim 1 further comprising:
responsive to a change of which portions of the file are accessed during the scanning step, updating the listing of accessed portions of the file.

7. The method of claim 1 wherein the accessed portions of the file are relocated to be contiguous with accessed portions of other files on the medium.

8. A non-transitory computer readable medium containing computer program code for efficiently scanning files for malicious code, the computer program code comprising:
program code for scanning a file on a medium for malicious code identified by a malicious code signature, the scanning comprising accessing portions of the file to examine the portions for the malicious code signature, the accessed portions of the file constituting less than all of the file;
program code for creating a listing of portions of the file accessed during the scanning for the malicious code signature; and
program code for utilizing the listing of accessed portions of the file to optimize a subsequent scan of the file by the computer for malicious code, wherein the utilizing comprises, prior to the subsequent scan of the file, relocating the accessed portions of the file to be contiguous on the medium.

9. The non-transitory computer readable medium of claim 8 wherein the program code for utilizing the listing of accessed portions of the file to optimize the subsequent scan of the file further comprises:
program code for reading only the listed portions of the file into dynamic memory from the medium prior to the subsequent scan of the file.

10. The non-transitory computer readable medium of claim 8 wherein the program code for utilizing the listing of accessed portions of the file to optimize the subsequent scan of the file further comprises:
program code for disabling operating system read-ahead during the subsequent scan of the file.

11. The non-transitory computer readable medium of claim 8 wherein the program code for utilizing the listing of accessed portions of the file to optimize the subsequent scan of the file further comprises:
program code for disabling operating system input-output caching during the subsequent scan of the file.

12. The non-transitory computer readable medium of claim 8 further comprising:
program code for causing a main thread to launch a separate thread;
program code for causing the separate thread to perform an optimized scan of the file utilizing the listing of accessed portions; and
program code for causing the main thread to process other files for malicious code scanning concurrently with the scanning of the file by the separate thread.

13. The non-transitory computer readable medium of claim 8 further comprising:
program code for, responsive to a change of which portions of the file are accessed during scanning, updating the associated listing of accessed portions of the file.

14. The non-transitory computer readable medium of claim 8 wherein the accessed portions of the file are relocated to be contiguous with accessed portions of other files on the medium.

15. A computer system for efficiently scanning files for malicious code, the computer system comprising:
a computer processor; and
a computer-readable storage medium storing software portions configured to execute on the computer processor, the software portions comprising:
a software portion configured to scan a file on a medium for malicious code identified by a malicious code signature, the scanning comprising accessing portions of the file to examine the portions for the malicious code signature, the accessed portions of the file constituting less than all of the file;
a software portion configured to create a listing of the portions of the file accessed during the scanning for the malicious code signature; and
a software portion configured to utilize the listing of accessed portions of the file to optimize a subsequent scan of the file by the computer for malicious code, wherein the utilizing comprises, prior to the subsequent scan of the file, relocating the accessed portions of the file to be contiguous on the medium.

16. The computer system of claim 15 wherein the software portion configured to utilize the listing of accessed portions of the file to optimize the subsequent scan of the file further comprises:
a software portion configured to read only the listed portions of the file into dynamic memory from the medium prior to the subsequent scan of the file.

17. The computer system of claim 15 wherein the software portion configured to utilize the listing of accessed portions of the file to optimize the subsequent scan of the file further comprises:
a software portion configured to disable operating system read-ahead during the subsequent scan of the file.

18. The computer system of claim 15 wherein the software portion configured to utilize the listing of accessed portions of the file to optimize the subsequent scan of the file further comprises:
a software portion configured to disable operating system input-output caching during the subsequent scan of the file.

19. The computer system of claim 15 further comprising:
a software portion configured to cause a main thread to launch a separate thread;
a software portion configured to cause the separate thread to perform an optimized scan of the file utilizing the listing of accessed portions; and
a software portion configured to cause the main thread to process other files for malicious code scanning concurrently with the scanning of the file by the separate thread.

20. The computer system of claim 15 further comprising:
a software portion configured to update the associated listing of accessed portions of the file, responsive to a change of which portions of the file are accessed during scanning.

21. The computer system of claim 15 wherein the accessed portions of the file are relocated to be contiguous with accessed portions of other files on the medium.

* * * * *